United States Patent [19]

Crockett

[11] Patent Number: 4,465,957
[45] Date of Patent: Aug. 14, 1984

[54] CIRCUIT AND METHOD FOR CONTROLLING SPEED OF AN ALTERNATING CURRENT MOTOR

[75] Inventor: Charles R. Crockett, Arlington, Tex.

[73] Assignee: Teccor Electronics, Inc., Irving, Tex.

[21] Appl. No.: 467,197

[22] Filed: Feb. 17, 1983

Related U.S. Application Data

[63] Continuation of Ser. No. 272,554, Jun. 11, 1981, abandoned.

[51] Int. Cl.³ ............................................. H02P 5/40
[52] U.S. Cl. ................................ 318/345 D; 318/812; 318/345 H
[58] Field of Search ............... 318/812, 809, 345 D, 318/345 H, 345 AB; 307/252 UA; 323/300

[56] References Cited

U.S. PATENT DOCUMENTS

| | | | |
|---|---|---|---|
| 3,443,188 | 5/1969 | Mortimer | 318/332 |
| 3,596,158 | 7/1971 | Watrous | 318/345 D |
| 3,604,996 | 9/1971 | Lutz | 318/345 C |
| 3,619,656 | 11/1971 | Dombe | 307/252 UA |
| 3,739,249 | 6/1973 | Rosenberry, Jr. | 318/227 |
| 3,821,634 | 6/1974 | Sabolic | 307/252 UA |
| 3,859,591 | 1/1975 | Saunders | 307/252 UA |
| 3,908,158 | 9/1975 | Studtmann | 318/227 |
| 4,121,141 | 10/1978 | Frazee | 318/326 |
| 4,190,793 | 2/1980 | Parker et al. | 318/800 |
| 4,311,956 | 1/1982 | Tolmie, Jr. | 323/300 |

OTHER PUBLICATIONS

Buckley, R., "Speed Controller System for a D.C. Motor", *Electrotechnology, Oct. 1978, vol. 6, No. 4, p. 133*.
Ernst et al., "Current Zero-Crossing Detection for Thyristor Control", IBM Tech Bull., vol. 15, No. 3, Aug. 1972, p. 734.

*Primary Examiner*—David Smith, Jr.
*Attorney, Agent, or Firm*—Hubbard, Thurman, Turner and Tucker

[57] ABSTRACT

A method of controlling the speed of an alternating current motor is disclosed. A direct current reference signal, the magnitude of which is proportional to the speed of an electric motor, is coupled to one input of a voltage comparator. A control pulse is generated at the beginning of each half cycle of the alternating current source and utilized to periodically discharge a timing capacitor. The voltage present on the timing capacitor is applied to a second input of the voltage comparator and when the timing capacitor voltage equals or exceeds the direct current reference signal, power is applied to the motor.

8 Claims, 1 Drawing Figure

CIRCUIT AND METHOD FOR CONTROLLING SPEED OF AN ALTERNATING CURRENT MOTOR

This is a continuation of application Ser. No. 272,554, filed June 11, 1981, now abandoned.

BACKGROUND OF THE INVENTION

This invention relates to circuits for controlling the speed of an electric motor and more particularly, to speed controls for use with alternating current motors.

It is well known in the prior art to control the speed of an alternating current motor by periodically interrupting the current flow to the motor so that power is supplied to the motor for some period less than a full cycle. A well known arrangement for accomplishing this method includes a silicon controlled rectifier or other controllable current conducting means in series with the motor and the alternating current source. Timing circuits are typically provided to trigger the silicon controlled rectifier or other controllable current conducting means at a selected phase angle within each half cycle, thereby controlling the power applied to the motor. It is also a common practice to provide a reactive component, such as a capacitor, as a means for timing the triggering of the controllable current conducting means. In such prior art circuitry the rate of charge of such components provided a reasonably acceptable means for triggering the controllable current device at some definite point during the period of an alternating current cycle.

Such circuits, however, have not been entirely reliable and several problems have existed which affect the operation thereof. In particular, timing capacitors utilized in prior art circuits would on occasion discharge at an inappropriate time and the controllable current conducting device would not function properly. Thus, the power supplied to the motor could be erratic under certain operating conditions.

An early example of a speed control circuit employing this type of technology may be seen in U.S. Pat. No. 3,443,118 issued to A. J. Mortimer. A much more complex circuit which attempted to solve the reliability problems experienced in such simple speed control circuits may be seen in U.S. Pat. No. 3,739,249 issued to G. M. Rosenberry, Jr. The Rosenberry, Jr. patent utilizes a complex charging mechanism to attempt to insure reliability of the action of the timing capacitor.

SUMMARY OF THE INVENTION

It is therefore an object of the present invention to provide an improved speed control for alternating current motors.

It is another object of the invention to provide a speed control which reliably supplies timing pulses to trigger a controllable bidirectional current conducting means supplying current to the electric motor.

It is yet another object of the invention to provide an improved timing circuit wherein triggering of the controllable bidirectional current conducting means is assured during each half cycle of the alternating current source.

The foregoing objects are achieved as is now described. A gate controlled bilateral switching device, such as a triac, is coupled in series with an alternating current motor. A control pulse circuit rectifies and truncates the output of the alternating current source to provide a square wave signal which is synchronized with the frequency of the alternating current source. The square wave signal thus generated is differentiated and a control pulse is generated at each voltage transition of the square wave signal. The control pulses are utilized to discharge a timing capacitor at the beginning of each half cycle of the alternating current source. As the voltage present on the timing capacitor increases during recharge, it is constantly compared with a DC reference signal which is proportional to the speed of the electric motor. At that point at which the voltage present on the timing capacitor equals or is greater than the direct current reference signal, the bilateral switching device is triggered and power is applied to the electric motor for the remainder of that half cycle of the alternating current source.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
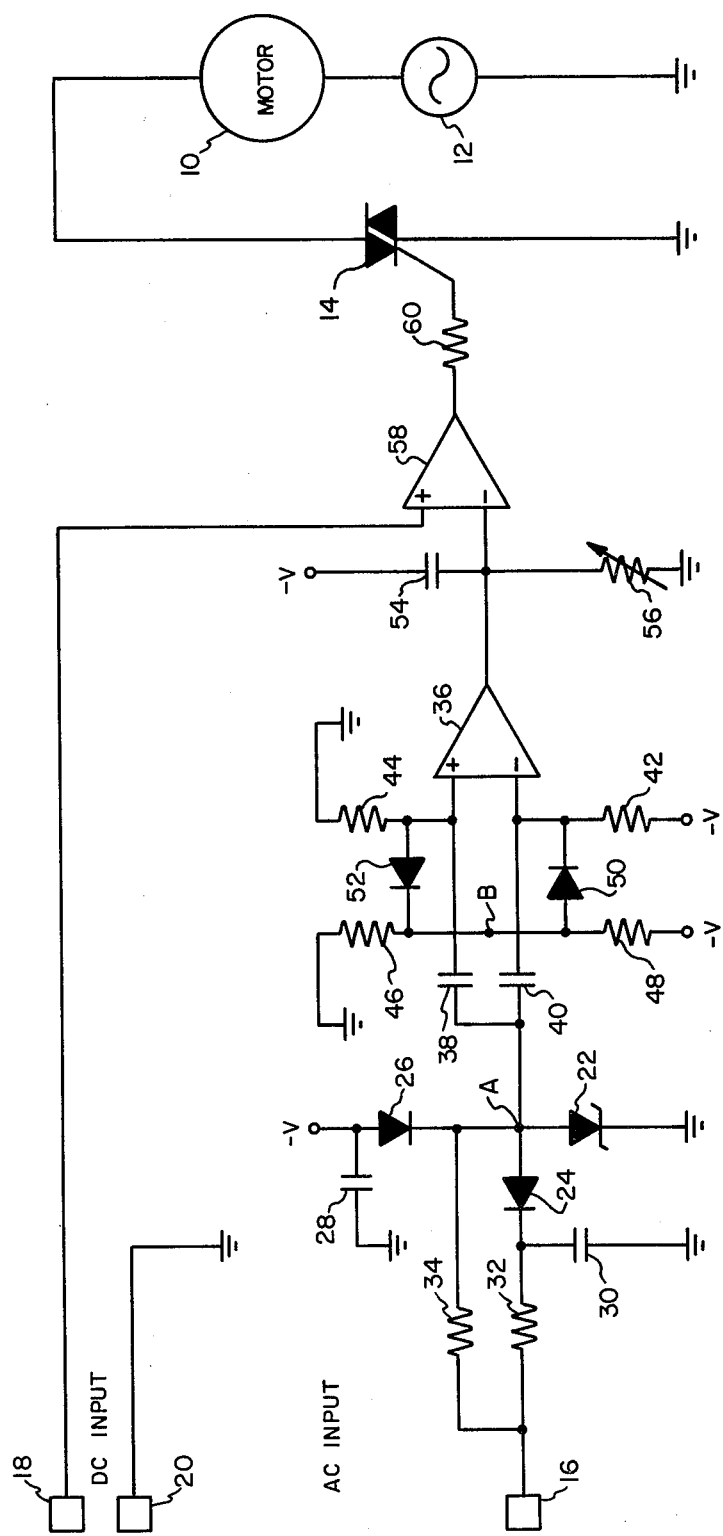
FIG. 1 depicts a schematic diagram of the alternating current motor speed control circuit of the present invention.

With reference now to FIG. 1, there is depicted a schematic diagram of the alternating current motor speed control of the present invention. The motor 10 is connected in series with an alternating current source 12 and a gate controlled bilateral switching device 14. Gate controlled bilateral switching device 14 acts as a current switch and, as those ordinarily skilled in the art will appreciate, may be utilized to interrupt current flow to motor 10.

Alternating current source 12 is also applied to the speed control circuit at pin 16. Alternating current source 12 is, in a preferred embodiment, a standard, single phase, 120 volt alternating current source. The 120 volt alternating current source is applied to resistor 34 and through resistor 34 and diode 24 to zener diode 22. Zener diode 22 is a 10 volt zener diode and will break down at voltages more negative than 10 volts. Diodes 24 and 26 have the effect of rectifying the 120 volt alternating current source so that the voltage present at point A will be a square wave alternating between ground and minus 10 volts. Diode 26 also allows capacitor 28 to charge to the minus 10 volt level and blocks discharge back into the circuit. The supply voltage, labeled −V in the depicted embodiment, is then utilized throughout the speed control circuit of FIG. 1.

The square wave generated by the rectification and truncation of alternating current source 12 is coupled to a first and second input of voltage comparator 36 by means of capacitor 38 and capacitor 40. Voltage comparator 36 utilizes a biasing network comprised of resistors 42, 44, 46 and 48 and diodes 50 and 52. The biasing network thus configured is utilized to insure that the output of voltage comparator 36 remains high during those periods when the square wave signal present at point A is not in a voltage transition and to insure that voltage comparator 36 acts as a differentiation circuit during voltage transitions of the square wave signal.

Resistors 42 and 44, in a preferred embodiment, are typically ten times as large as resistors 46 and 48. Resistors 46 and 48 are selected to be identical in resistance, and therefore, point B, which is located between resistor 46 and 48, will be maintained at approximately one half of the supply voltage level ($-V/2$). Thus, during periods of time when the square wave present at point A is not in a voltage transition, both diode 50 and 52 will be forward biased and the positive (noninverting) input into voltage comparator 36 will be at a higher voltage level than the minus (inverting) input to voltage comparator 36. This occurs due to the voltage drop typically experienced across a forward biased conducting diode. Thus, the voltage present at the noninverting input of voltage comparator 36 will, during the periods of time when the square wave present at point A is not in a voltage transition, be two diode drops higher than the voltage present at the inverting input, and the output of voltage comparator 36 will remain high.

As long as the output of voltage comparator 36 remains high, timing capacitor 54 will charge toward $-V$ through trim resistor 56. The instantaneous voltage present between timing capacitor 54 and trim resistor 56 is applied to the inverting input of voltage comparator 58. The noninverted input of voltage comparator 58 is a direct current reference signal which is provided, in a preferred embodiment, as the output of an electric tachometer such as the type typically utilized with alternating current motors. The magnitude of the direct current reference signal applied to the noninverting input of voltage comparator 58 will be directly proportional to the speed of motor 10.

Referring once again to the square wave present at point A in the speed control circuit of the present invention, it is necessary to examine the output of voltage comparator 36 during those periods of time that the square wave signal present at point A is experiencing a voltage transition.

First considering a positive going transition of the square wave present at point A, it should be apparent to those ordinarily skilled in the art that such a transition will cause diode 50 to be reverse biased. Diode 52 will continue to be forward biased, and as a result, the voltage present at the noninverting input of voltage comparator 36 will increase. At that point at which the voltage present at the noninverting input of voltage comparator 36 equals or exceeds the voltage present at the noninverting input of voltage comparator 36, the output of voltage comparator 36 will rapidly change polarity, generating a negative spike. As the output of voltage comparator 36 approaches $-V$, timing capacitor 54 will be rapidly discharged. After the positive going transition of the square wave present at point A has passed, the output of voltage comparator 36 will once again change polarities and timing capacitor 54 will begin to charge.

During negative voltage transitions of the square wave present at point A, the inverse occurs. Diode 52 will be reverse biased and diode 50 will be forward biased. The negative going transition will be felt at the noninverting input to voltage comparator 36. At that point at which the voltage at the noninverting input of voltage comparator 36 is equal to or less than the voltage present at the inverting input of voltage comparator 36 the output of voltage comparator 36 will again change state. This will again generate a negative going spike on the output of voltage comparator 36, and will result in timing capacitor 54 being rapidly discharged.

Thus it can be seen that at the beginning of each half cycle of alternating current source 12, a control pulse will be generated at the output of voltage comparator 36 and timing capacitor 54 will be discharged. By properly selecting the value of trim resistor 56, the time constant associated with the charging of timing capacitor 54 may be altered so that the voltage present on timing capacitor 54, after a selected time period, will be equal to or greater than the direct current reference signal applied to the noninverting input of voltage comparator 58. At the point where the voltage present at the inverting input of voltage comparator 58 is equal to or greater than the direct current reference signal generated by the tachometer associated with motor 10, the output of voltage comparator 58 will change state and gate drive current will be provided through resistor 60 to the gate of gate controlled bilateral switching device 14. Thus, the amount of power applied to motor 10 during each single half cycle of alternating current source 12 may be simply, accurately and reliably controlled utilizing the speed control circuit of the present invention.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A circuit for controlling the speed of a motor powered by an alternating current source in response to a direct current reference signal, said circuit comprising:
   a gate controlled bilateral switching device coupled in series with said motor;
   means for half wave rectifying said alternating current power source;
   means for generating a square wave signal synchronized to the frequency of said half wave rectified alternating current source;
   means for differentiating said square wave signal wherein a control pulse is generated at each voltage transition of said square wave signal;
   a timing capacitor;
   means for discharging said timing capacitor in response to the presence of said control pulse;
   means for charging said timing capacitor; and
   means coupled to said timing capacitor and said direct current reference signal for triggering said gate controlled bilateral switching device.

2. The circuit according to claim 1 wherein the magnitude of said direct current reference signal is proportional to the speed of said motor.

3. The circuit according to claim 1 wherein said gate controlled bilateral switching device comprises a triac device.

4. The circuit according to claim 1 wherein said means for generating a square wave signal comprises means for truncating said half wave rectified alternating current source.

5. The circuit according to claim 1 wherein said means for selectively triggering said gate controlled bilateral switching device comprises a voltage comparator with one input coupled to said timing capacitor and one input coupled to said direct current reference signal.

6. A circuit for controlling the speed of a motor powered by an alternating current source in response to a direct current reference signal, said circuit comprising:
- a gate controlled bilateral switching device coupled in series with said motor;
- means for half wave rectifying said alternating current power source;
- means for generating a square wave signal synchronized to the frequency of said half wave rectified alternating current source;
- means for differentiating said square wave signal wherein a control pulse is generated at each voltage transition of said square wave signal;
- a timing capacitor;
- means for discharging said timing capacitor in response to the present of said control pulse;
- means for charging said timing capacitor; and
- voltage comparator means for triggering said gate controlled bilateral switching device, said voltage comparator means having one input coupled to said timing capacitor and a second input coupled to said direct current reference signal.

7. The circuit according to claim 6 wherein the magnitude of said direct current reference signal is proportional to the speed of said motor.

8. The circuit according to claim 6 wherein said gate controlled bilateral switching device comprises a triac device.

* * * * *